(12) United States Patent
Adachi et al.

(10) Patent No.: US 9,048,504 B2
(45) Date of Patent: Jun. 2, 2015

(54) SECONDARY BATTERY ELECTRODE, METHOD FOR MANUFACTURING SAME, AND SECONDARY BATTERY

(75) Inventors: Momoe Adachi, Tokyo (JP); Isamu Konishiike, Fukushima (JP); Kenichi Kawase, Fukushima (JP)

(73) Assignee: SONY CORPORATION, Tokyo (JP)

( * ) Notice: Subject to any disclaimer, the term of this patent is extended or adjusted under 35 U.S.C. 154(b) by 1697 days.

(21) Appl. No.: 11/958,112

(22) Filed: Dec. 17, 2007

(65) Prior Publication Data

US 2008/0160420 A1    Jul. 3, 2008

(30) Foreign Application Priority Data

Dec. 27, 2006    (JP) .................. 2006-351041

(51) Int. Cl.
| | |
|---|---|
| *H01M 4/74* | (2006.01) |
| *H01M 4/72* | (2006.01) |
| *H01M 10/052* | (2010.01) |
| *H01M 4/04* | (2006.01) |
| *H01M 4/134* | (2010.01) |
| *H01M 4/1395* | (2010.01) |
| *H01M 4/36* | (2006.01) |
| *H01M 4/38* | (2006.01) |
| *H01M 4/62* | (2006.01) |
| *H01M 4/64* | (2006.01) |
| *H01M 4/66* | (2006.01) |
| *H01M 10/0565* | (2010.01) |
| *H01M 10/0569* | (2010.01) |
| *H01M 4/02* | (2006.01) |

(52) U.S. Cl.
CPC .......... *H01M 10/052* (2013.01); *H01M 4/0423* (2013.01); *H01M 4/134* (2013.01); *H01M 4/1395* (2013.01); *H01M 4/366* (2013.01); *H01M 4/38* (2013.01); *H01M 4/623* (2013.01); *H01M 4/64* (2013.01); *H01M 4/661* (2013.01); *H01M 10/0565* (2013.01); *H01M 10/0569* (2013.01); *H01M 2004/021* (2013.01); *H01M 2300/0085* (2013.01); *Y02E 60/122* (2013.01)

(58) Field of Classification Search
CPC . H01M 4/0423; H01M 4/134; H01M 4/1395; H01M 4/661
USPC .................................................. 429/241, 233
See application file for complete search history.

(56) References Cited

U.S. PATENT DOCUMENTS

| | | |
|---|---|---|
| 6,051,340 A | 4/2000 | Kawakami et al. |
| 6,432,579 B1 | 8/2002 | Tsuji et al. |
| 2002/0132167 A1* | 9/2002 | Gan et al. ...................... 429/241 |
| 2004/0029012 A1* | 2/2004 | Tanizaki et al. .......... 429/231.95 |
| 2004/0131934 A1* | 7/2004 | Sugnaux et al. .............. 429/209 |

FOREIGN PATENT DOCUMENTS

| | | |
|---|---|---|
| JP | 08-050922 | 2/1996 |
| JP | 29-48205 | 2/1999 |
| JP | 11-135115 | 5/1999 |

(Continued)

*Primary Examiner* — Helen O Conley
(74) *Attorney, Agent, or Firm* — K&L Gates LLP

(57) ABSTRACT

A secondary battery electrode includes an active material layer configured to be provided on a current collector and be obtained by stacking a plurality of active material sub-layers composed of an active material. Pores of which pore diameter along a thickness direction of the active material layer is 3 to 300 nm are formed along a boundary between the active material sub-layers, and at least a part of the pores is filled with an electrolyte and/or a product arising from reduction of the electrolyte upon assembling of a secondary battery.

22 Claims, 7 Drawing Sheets

(56) References Cited

FOREIGN PATENT DOCUMENTS

| JP | 2003-272625 | * | 9/2003 | .............. H01M 4/58 |
| JP | 2004-349162 | | 12/2004 | |
| JP | 2005-285651 | | 10/2005 | |
| JP | 2005-294274 | | 10/2005 | |
| JP | 2006-196447 | | 7/2006 | |
| JP | 2006-261092 | | 9/2006 | |

* cited by examiner

ENLARGE

AVERAGE HEIGHT OF ADJACENT TEN FINE PORES

WORKING EXAMPLE 22

WORKING EXAMPLE 23

SECONDARY BATTERY ELECTRODE, METHOD FOR MANUFACTURING SAME, AND SECONDARY BATTERY

CROSS REFERENCES TO RELATED APPLICATIONS

The present application claims priority to Japanese Patent Application JP 2006-351041 filed with the Japan Patent Office on Dec. 27, 2006, the entire contents of which is being incorporated herein by reference.

BACKGROUND

The present application relates to a secondary battery electrode suitable for a lithium ion secondary battery and so on, a method for manufacturing the same, and a secondary battery employing the electrode, and mainly to improvement in the load characteristic.

In recent years, mobile apparatus having higher performance and more functions is being developed. This trend demands secondary batteries employed in the mobile apparatus as its power supply to have smaller size, lighter weight, smaller thickness, and higher capacity.

Among secondary batteries that can meet this demand is a lithium ion secondary battery. Battery characteristics of the lithium ion secondary battery greatly change depending on an employed electrode active material and so on. In a typical lithium ion secondary battery currently put into practical use, lithium cobalt oxide is used as its cathode active material and graphite is used as its anode active material. The battery capacity of the lithium ion secondary battery having such a configuration is approaching the theory capacity, and hence it is difficult to greatly increase the capacity through future improvements.

For a solution thereto, studies are being made on a scheme in which silicon or tin, which will be alloyed with lithium in charging, is used as the anode active material for realization of great increase in the capacity of the lithium ion secondary battery. However, when silicon or tin is used as the anode active material, the degree of the expansion and contraction of the anode active material layer accompanying charging and discharging is high, which leads to a problem of the lowering of the cycle characteristic due to the turning of the active material into fine particles or the separation of the active material from the anode current collector attributed to the expansion/contraction accompanying the charging/discharging.

As a related art, a coated-type anode obtained by applying slurry that contains a granular active material and a binder on an anode current collector has been used. In contrast, in recent years, there have been proposed anodes formed by depositing an anode active material layer such as a silicon layer on an anode current collector by a vapor-phase method, liquid-phase method, sintering, or the like (refer to e.g. Japanese Patent Laid-open No. Hei 8-50922, Japanese Patent No. 2948205, and Japanese Patent Laid-open No. Hei 11-135115). According to these documents, in such an anode, the anode active material layer is formed monolithically with the anode current collector. Therefore, compared with the coated-type anode, the fine-dividing of the active material due to expansion/contraction accompanying charging/discharging can be suppressed, and thus the initial discharge capacity and the charge/discharge cycle characteristic are improved. Furthermore, an advantage of improvement in the electron conductivity in the anode is also achieved.

However, also in this anode, for which an anode active material layer is formed monolithically with an anode current collector and the manufacturing method is improved, repetition of charging/discharging applies stress to the interface between the anode active material layer and the anode current collector due to the significant expansion/contraction of the anode active material layer, and thus the cycle characteristic will be lowered due to separation of the anode active material layer from the anode current collector, and so on.

To address this problem, in Japanese Patent Laid-open No. 2004-349162 (Pages 4, 5, and 8, FIGS. 2 and 3, hereinafter Patent Document 1), an anode composed of an anode current collector and an anode active material layer formed on the anode current collector by a vapor-phase method is proposed. This anode active material layer is formed by alternately stacking plural first layers and plural second layers that contain silicon and have different oxygen content. The first layers contain elemental silicon or a silicon alloy as the anode active material. Although the first layers may contain oxygen or may not, it is preferable that the oxygen content be low because lower oxygen content provides higher capacity. The second layers contain oxygen in addition to silicon. The oxygen is coupled with the silicon and thus exists as an oxide. It is preferable that in the second layers, the silicon content be 90 atomic % or lower and the oxygen content be 10 atomic % or higher.

According to Patent Document 1, in the anode having such a configuration, significant expansion/contraction accompanying charging/discharging is suppressed, and thus the structural destruction of the anode active material layer accompanying the charging/discharging is effectively suppressed. Furthermore, the reactivity between an electrolyte and the anode active material layer is reduced.

In the anode disclosed in Patent Document 1, the structural destruction of the anode active material layer is effectively suppressed, and thus the charge/discharge cycle characteristic is improved. However, the present inventors have found the following fact as a result of committed researches. Specifically, the oxygen-containing layer is merely one form of the active material layer having a multilayer structure, and further development in the active material layer having a multilayer structure can enhance not only the charge/discharge cycle characteristic but also the load characteristic.

SUMMARY

The present application provides, as a secondary battery electrode suitable for a lithium ion secondary battery and so on, a secondary battery electrode that is superior in provision of a favorable load characteristic in particular in addition to a favorable charge/discharge cycle characteristic, and to provide a method for manufacturing the electrode and a secondary battery employing the electrode.

According to an embodiment, there is provided a secondary battery electrode. The secondary battery electrode includes an active material layer configured to be provided on a current collector and be obtained by stacking a plurality of active material sub-layers composed of an active material. In the secondary battery electrode, pores of which pore diameter along the thickness direction of the active material layer is 3 to 300 nm are formed along the boundary between the active material sub-layers, and at least a part of the pores is filled with an electrolyte and/or a product arising from reduction of the electrolyte upon assembling of a secondary battery. Furthermore, according to another embodiment, there is provided the method for manufacturing the secondary battery electrode. The method includes the steps of forming an active material sub-layer that has an uneven surface by depositing the active material on the current collector unevenly at least on the surface side, and stacking another active material sub-layer on the active material sub-layer that has the uneven surface to thereby form the pores along the boundary between both the active material sub-layers. In the method, each of the steps is carried out at least once to thereby form the active material layer.

According to further another embodiment, there is provided a secondary battery that is provided with the secondary battery electrode as its anode and includes a cathode and an electrolyte.

The pore diameter refers to the diameter of pores in one active material layer, and encompasses also a pore diameter over 300 nm resulting from coupling of plural pores across plural layers along the thickness direction. The "unevenness" of the uneven surface may be shape unevenness such as recesses and projections on the surface, or alternatively may be physical and/or chemical unevenness of the surface, such as variation in the oxygen content among areas.

As described above, a related-art stacked-type battery electrode formed by a vapor-phase deposition method or liquid-phase method involves a problem that the influence of electrode expansion/contraction due to charging/discharging is larger compared with a battery electrode formed by a method such as sintering or coating with use of a binder. Furthermore, a path that allows the passage of electrolyte ions such as lithium ions therethrough does not exist in the active material layer. Therefore, the area in which charging/discharging reaction rapidly occurs is limited to the surface of the active material layer in contact with the electrolyte and the vicinity thereof, and reaction inside the active material layer is rate-limited by the speed of the diffusion of the substance involved in the reaction in the solid. Consequently, the reaction does not proceed evenly in the active material layer as a whole problematically.

The secondary battery electrode according to one embodiment includes an active material layer configured to be provided on a current collector and be obtained by stacking a plurality of active material sub-layers composed of an active material. In the secondary battery electrode, pores of which pore diameter along the thickness direction of the active material layer is 3 to 300 nm are formed along the boundary between the active material sub-layers, and at least a part of the pores is filled with an electrolyte and/or a product arising from reduction of the electrolyte upon assembling of a secondary battery. Therefore, when a secondary battery is assembled by use of this electrode, the pores are filled with the electrolyte and/or the product arising from reduction of the electrolyte, to thereby form paths that allow the passage of electrolyte ions such as lithium ions therethrough. Thus, in charging/discharging reaction, the electrolyte ions do not only react with the active material at the surface of the active material layer in contact with the electrolyte, but also deeply enter the inside of the active material layer via the pores and react with the active material thereat. Consequently, the entire active material layer is utilized as the reaction area, including the inside of the active material layer, in which reaction does not readily occur in a related-art stacked-type secondary battery electrode.

As a result, the load characteristic of the battery is greatly enhanced by the secondary battery electrode according to one embodiment. Moreover, the expansion/contraction of the active material layer occurs not only at the surface but also in the inside, and hence the difference in the degree of the expansion/contraction is small across the entire active material layer. This can prevent separation of the active material layer from the electrode due to the expansion/contraction accompanying charging/discharging and can prevent the destruction of the electrode structure, and thus a stable electrode shape can be achieved.

The insides of the pores are gradually filled with a reduction product arising from reduction of the electrolyte through repetition of charging/discharging, and finally are completely filled with the reduction product. This reduction product forms paths that allow the passage of electrolyte ions therethrough, which can keep a favorable load characteristic of the secondary battery electrode according to one embodiment. In terms of this final result, the pores serve as intermediate measures to form the paths for the electrolyte ions by use of the reduction product.

If the pore diameter of the pores along the thickness direction of the active material layer is smaller than 3 nm, no specific effect is found. In contrast, when the pore diameter becomes too large, the volume of gaps in the active material layer becomes large and thus the amount of the active material layer itself decreases, which decreases the capacity. In addition, the active material layer becomes fragile, which easily causes capacity lowering due to separation of the active material layer from the electrode attributed to expansion/contraction accompanying charging/discharging cycles. Furthermore, the degree of coat formation reaction due to the reduction of the electrolyte solution also becomes higher, which lowers the load characteristic. A pore diameter over 300 nm is undesirable because the extent of the above-described disadvantages becomes higher than that of the advantages like in e.g. Comparative example 3 to be described later.

In the method for manufacturing a battery electrode according to one embodiment, initially an active material sub-layer that has an uneven surface is formed by depositing the active material on the current collector unevenly at least on the surface side. Therefore, when subsequently another active material sub-layer is stacked on this active material sub-layer having the uneven surface, due to unevenness of the deposition rate of the active material, the pores are formed above areas of the lower sub-layer in which the film deposition rate is low along the boundary between these active material sub-layers. As a result, this manufacturing method can form the above-described battery electrode easily with high productivity.

Furthermore, because the secondary battery according to one embodiment is provided with the above-described secondary battery electrode as its anode and includes a cathode and an electrolyte, the secondary battery can exert excellent load characteristic and charge/discharge cycle characteristic by the secondary battery electrode.

Additional features and advantages are described herein, and will be apparent from, the following Detailed Description and the figures.

DETAILED DESCRIPTION

Figure 1A:
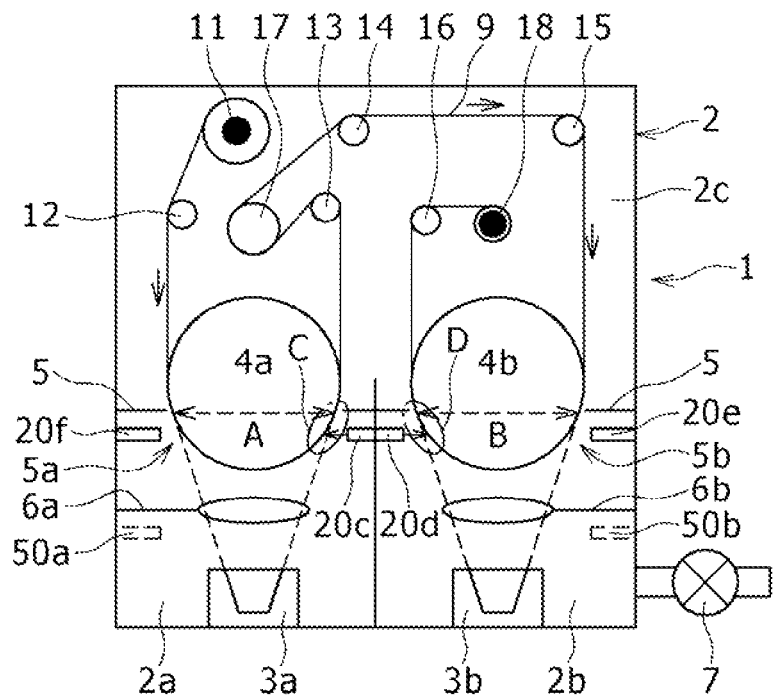
FIGS. 1A and 1B are schematic diagrams showing the structure of an electrode forming apparatus based on a first embodiment.

In the secondary battery electrode according to one embodiment, it is preferable that the ion-permeable pores include fine pores communicating with each other. Furthermore, it is preferable that at least a part of the ion-permeable pores be filled with the electrolyte and/or the product arising from reduction of the electrolyte. This feature allows the ion-permeable pores to function as favorable paths for electrolyte ions.

In the secondary battery electrode and the manufacturing method thereof according to embodiments, it is preferable that the active material contain elemental silicon or a silicon compound or contain elemental tin or a tin compound. If silicon or tin is used as the active material, the capacity of a lithium ion secondary battery and the like can be enhanced. However, with a related-art electrode structure, the destruction of the electrode structure will occur due to expansion accompanying charging, which lowers the charge/discharge cycle characteristic. Furthermore, the reaction area is limited to the surface of the active material layer and the vicinity thereof, which imposes a limitation on the load characteristic. The secondary battery electrode according to one embodiment can be applied to such an active material most effectively.

Furthermore, it is preferable that the active material sub-layers be formed by a vapor-phase deposition method. As the vapor-phase deposition method, e.g. vacuum evaporation is preferable. Because the vacuum evaporation allows a high film deposition rate, the active material sub-layers can be formed with high productivity.

In addition, it is preferable that the current collector be bonded to the active material sub-layer through alloying with the active material sub-layer across at least a part of the boundary with the active material sub-layer, or through diffusion of a constituent element of the current collector into the active material layer across the boundary, or diffusion of a constituent element of the active material layer into the current collector, or diffusion of both the constituent elements into each other. This feature can enhance the adhesion between the active material layer and the current collector through the alloying or diffusion. Thus, fine-dividing of the active material due to expansion/contraction accompanying charging/discharging is suppressed, which prevents separation of the active material layer from the current collector. Furthermore, an advantage of improvement in the electron conductivity in the secondary battery electrode is also achieved.

It is preferable that the surface roughness of the surface of the current collector on which the active material sub-layer is provided is 2.0 to 4.5 μm in a ten-point averaged roughness Rz. If the Rz value is 2.0 μm or higher, the adhesion between the active material layer and the current collector is high. However, if the Rz value surpasses 4.5 μm and hence the surface roughness is too high, there is a fear of the occurrence of cracks in the current collector accompanying the expansion of the active material layer. The "surface roughness Rz" refers to the ten-point averaged roughness defined by JIS B0601-1994 (the same hereinafter). It is sufficient that, of the entire current collector, the area on which the active material layer is provided has Rz values in the above-shown range.

Furthermore, it is preferable that the current collector be composed of a material containing copper. Copper is suitable for a lithium ion secondary battery because it does not react with lithium but is alloyed with silicon. If an electrolytic copper foil is used, a copper foil having a desired surface roughness can be used.

In the method for manufacturing a secondary battery electrode according to one embodiment, it is preferable that an active material sub-layer main part be formed by evenly depositing the active material on the current collector and the active material be unevenly deposited on the active material sub-layer main part to thereby form the active material sub-layer that has the uneven surface. According to this method, the active material sub-layer main part is evenly formed similarly to related arts, and an uneven area can be formed only near the surface of the active material sub-layer.

It is preferable that a current collector having an elongated shape be used as the current collector and be moved along the longitudinal direction of the current collector, and the current collector be caused to pass through an uneven formation area for formation of the active material sub-layer that has the uneven surface after being caused to pass through a formation area for an active material sub-layer main part for formation of the active material sub-layer main part. Embodiments may be applied to film deposition in which the current collector is fixed. However, when the current collector is moved and caused to pass through the formation area for an active material sub-layer main part and the uneven formation area, manufacturing apparatus can be simplified because these two areas can be spatially separated from each other. Furthermore, the above-described secondary battery electrode can be manufactured with high controllability and productivity.

It is preferable that in the uneven formation area, a gas be sprayed on the surface of the active material sub-layer main part on which the active material is being deposited, to thereby form the active material sub-layer that has the uneven surface. This method can form the uneven formation area with simple and compact equipment. It is preferable that the flow rate of the gas be set to 8 to 400 sccm. If the gas flow rate is lower than 8 sccm, the pore diameter of the ion-permeable pores becomes smaller than 3 nm. In the gas flow rate is higher than 400 sccm, the pore diameter of the ion-permeable pores surpasses 300 nm. Therefore, a gas flow rate outside this range is unfavorable as described above.

In the method for manufacturing a secondary battery electrode according to one embodiment, it is also possible to modify the film deposition rate to thereby form the active material sub-layer that has the uneven surface. For example, it is preferable that vapor-phase deposition be carried out by vacuum evaporation based on electron beam heating, and the irradiation area of an electron beam in an evaporation source be varied to thereby modulate the film deposition rate.

In the secondary battery according to one embodiment, it is preferable that a lithium compound be contained in a cathode active material of the cathode. It is preferable that embodiments be used to manufacture a battery electrode for a secondary battery such as a lithium ion secondary battery.

Furthermore, it is preferable that a cyclic carbonate ester or/and a chain carbonate ester be used as the solvent of the electrolyte. In particular, it is preferable that a fluorine-containing compound obtained by substituting a fluorine atom for a part or all of hydrogen atoms in the cyclic carbonate ester or/and the chain carbonate ester be contained as the solvent. Moreover, it is more preferable that the electrolyte contain at least one of a sulfonic acid, a sulfinic acid, and derivatives of these acids, i.e., a compound having an S=O bond. Such an electrolyte offers an enhanced cycle characteristic.

Embodiments will be described in detail below with reference to the accompanying drawings.

First Embodiment

The following description for a first embodiment relates mainly to an example corresponding to the secondary battery electrodes set forth in claims 1 and 2 and the methods for manufacturing a secondary battery electrode set forth in claims 9 to 13.

FIG. 1 is a schematic diagram showing the structure of electrode forming apparatus 1 based on the first embodiment. This electrode forming apparatus 1 is vacuum evaporation apparatus and includes a vacuum chamber 2, evaporation sources 3a and 3b, circular can rolls (film deposition rolls) 4a and 4b, a shielding plate 5, shutters 6a and 6b, and a vacuum evacuation unit 7. Furthermore, as units for moving a strip current collector 9 in its longitudinal direction, two take-up rollers 11 and 18, guide rollers 12 to 16, and a feed roller 17 are provided. The respective units will be described below.

The vacuum chamber 2 is partitioned by the shielding plate 5 into evaporation source rooms 2a and 2b and a current collector room 2c. The evaporation source 3a is disposed in the evaporation source room 2a, and the evaporation source 3b is disposed in the evaporation source room 2b. These evaporation source rooms are separated from each other by an isolating plate 8. In the current collector room 2c, the circular can rolls 4a and 4b are disposed above the evaporation sources 3a and 3b, respectively. At two positions of the shielding plate 5, openings 5a and 5b are provided corresponding to the circular can rolls 4a and 4b, so that evaporation areas A and B are defined as active material sub-layer formation areas.

In the evaporation areas A and B, the active material discharged from the evaporation sources 3a and 3b is deposited on the current collector 9. The flow of the active material in the evaporation areas A and B is controlled by the shutters 6a and 6b. The shielding plate 5 is used to shield the current collector 9 positioned in areas other than the evaporation areas A and B and the units for moving the current collector from transmission of heat generated from the evaporation sources 3a and 3b thereto and adhesion of the active material thereto. The vacuum evacuation unit 7 can execute evacuation to decrease the pressure in the chamber 2 to below a predetermined pressure.

It is preferable that the evaporation sources 3a and 3b be based on heating by a deflected electron beam. Each of the evaporation sources 3a and 3b is formed of an electron gun, crucible, hearth, and the active material. The electron gun has a function to heat the active material through irradiation thereof with an electron beam to thereby evaporate the active material. In the crucible, the active material is disposed with the intermediary of the hearth composed mainly of carbon.

The strip current collector 9 formed of an electrolytic copper foil is so disposed as to be stretched on the respective outer circumferential planes of the circular can rolls 4a and 4b, the guide rollers 12 to 16, and the feed roller 17. Both the ends of the current collector 9 are wound up by two take-up rollers 11 and 18. Cooling water is passed through a part or all of the circular can rolls 4a and 4b, the guide rollers 12 to 16, and the teed roller 17 to thereby allow cooling of the current collector 9 by the water.

A feature of the electrode forming apparatus 1 is that it is provided with gas inlets 20c to 20f such as a gas injection nozzle near the current collector 9 as well as the above-described equipment as vacuum evaporation apparatus. From the respective gas inlets, a gas of argon, carbon dioxide, oxygen or the like, or a mixture gas of any of these substances can be injected as the above-described gas toward the current collector 9.

As shown in FIG. 1A, the gas inlets 20c and 20d are disposed at such positions as to, when the current collector 9 is moved in the forward direction, allow the gas injected from the gas inlets 20c and 20d to fall on areas near the exit ends of the evaporation areas A and B, respectively, to thereby disturb the flow of the active material in these areas. As a result, in the forward movement, the gas inlet 20c forms an uneven formation area C in which the active material is unevenly deposited, in the area near the exit end of the evaporation area A. Furthermore, the gas inlet 20d forms an uneven formation area D in which the active material is unevenly deposited, in the area near the exit end of the evaporation area B.

Figure 1B:
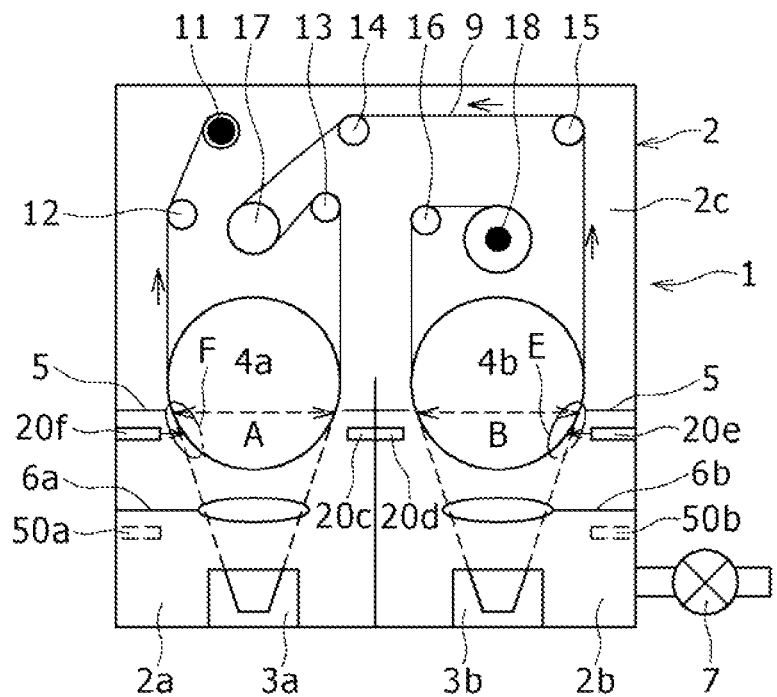

Similarly, as shown in FIG. 1B, the gas inlets 20e and 20f are disposed at such positions as to, when the current collector 9 is moved in the backward direction, allow the gas injected from the gas inlets 20e and 20f to fall on areas near the exit ends of the evaporation areas B and A, respectively, to thereby disturb the flow of the active material in these areas. As a result, in the backward movement, the gas inlet 20e forms an uneven formation area E in which the active material is unevenly deposited, in the area near the exit end of the evaporation area B. Furthermore, the gas inlet 20f forms an uneven formation area F in which the active material is unevenly deposited, in the area near the exit end of the evaporation area A.

The above-described gas introduction scheme is merely one example, and there is no particular limitation on the shape, number, arrangement, etc. of the gas introduction units. It is important to disturb the flow of the active material near the surface of the active material sub-layer main part, and therefore any unit is available as long as it can form the effective uneven formation areas C to F. For example, it is also possible to inject gases from the gas inlets 20e and 20f when the current collector 9 is moved in the forward direction. However, the fine pores are readily formed when the gas is introduced to the vicinity of the current collector 9 near the exit ends of the evaporation areas A and B.

FIG. 2 is a sectional view of the current collector 9 and an active material layer 10 for explaining the flow of an electrode forming step. The electrode forming step will be described below with reference to FIGS. 1 and 2.

For formation of a battery electrode by use of the electrode forming apparatus 1, initially the current collector 9 is so disposed as to be stretched over the respective outer circumferential planes of the circular can rolls 4a and 4b, the guide rollers 12 to 16, and the feed roller 17. Both the ends of the current collector 9 are wound up by two take-up rollers 11 and 18. At first, one end side is not wound up, whereas all of the other end side is wound up by e.g. the take-up roller 11.

Subsequently, the vacuum chamber 2 is evacuated by the vacuum evacuation unit 7. When the pressure in the vacuum chamber 2 is decreased to below a predetermined pressure, an electron beam is emitted from the electron gun to the active material to thereby heat the active material, with the shutters 6a and 6b closed. To shorten the tact time, the electron-beam heating of the active material may be gradually advanced along with increase in the degree of vacuum.

When the active material has entered a predetermined melted state, the shutters 6a and 6b are opened and thus the active material layer 10 is formed on the current collector 9 while the current collector 9 is moved. This step will be described in detail below.

Figure 2A:
FIGS. 2A to 2H are sectional views of a current collector and active material sub-layers for explaining the flow of an electrode forming step based on the first embodiment.
Figure 2B:
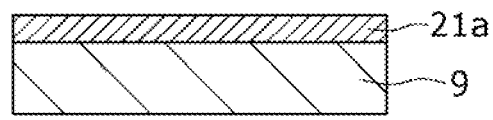
Figure 2C:
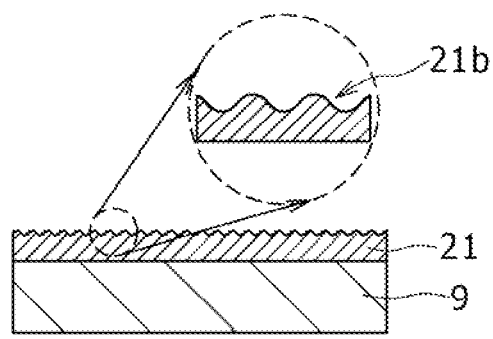

Initially, the current collector 9 is drawn out from the take-up roller 11 so as to be moved on the circular can roll 4a, so that the active material evaporated from the evaporation source 3a is deposited on one surface (e.g., the front-side surface) of the current collector 9 in the evaporation area A. In most part of the evaporation area A, the active material is evenly deposited. However, in the uneven formation area C near the exit end of the evaporation area A, the active material is unevenly deposited. As a result, as shown in FIGS. 2A to 2C, although nothing is formed on the surface of the current collector 9 drawn out from the take-up roller 11, an active material sub-layer main part 21a having an even thickness is formed until the entrance end of the uneven formation area C, and then an active material sub-layer 21 having a surface 21b that involves unevenness such as recesses and projections is formed until the exit end of the uneven formation area C.

The current collector 9 that has passed through the evaporation area A is conveyed to the evaporation area B via the feed roller 17 and the guide rollers 14 and 15. It is preferable that the feed roller 17 be composed of an elastic substance such as rubber in order to ensure sufficient friction with the current collector 9 formed of an electrolytic copper foil or the like. The guide rollers 14 and 15 function to "reverse" the surface of the current collector 9 facing the evaporation source from the front-side surface to the back-side surface so that the current collector 9 may be in contact with the circular can roll 4b via its surface (front-side surface) on which the active material sub-layer 21 has been formed in the evaporation area A and the opposite-side surface (back-side surface) thereof may face the evaporation source 3b in the evaporation area B.

Figure 2D:
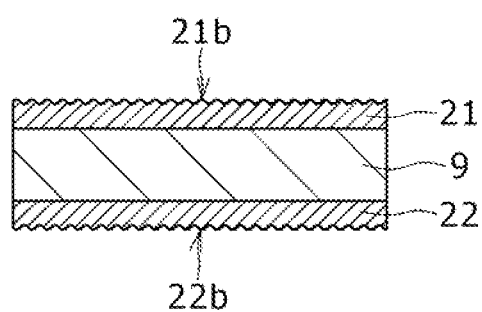

The current collector 9 is moved on the circular can roll 4b, so that the active material evaporated from the evaporation source 3b is deposited on the back-side surface of the current collector 9 in the evaporation area B. In most part of the evaporation area B, the active material is evenly deposited. However, in the uneven formation area D near the exit end of the evaporation area B, the active material is unevenly deposited. As a result, as shown in FIG. 2D, an active material sub-layer main part having an even thickness is formed on the back-side surface of the current collector 9 until the entrance end of the uneven formation area D, and then an active material sub-layer 22 having a surface 22b that involves unevenness such as recesses and projections is formed thereon until the exit end of the uneven formation area D.

The current collector 9 that has passed through the uneven formation area D is wound up by the take-up roller 18. In the above-described manner, while one region of the current collector 9 is forward moved from the take-up roller 11 to the take-up roller 18, the active material sub-layers 21 and 22 are formed on the front-side surface and the back-side surface, respectively, in this region. When the entire current collector 9 has been wound up by the take-up roller 18 after being drawn out from the take-up roller 11, the active material sub-layers 21 and 22 have been formed in the entire region of the current collector 9.

Thereafter, the movement direction of the current collector 9 is reversed. As shown in FIG. 1B, in the backward movement, initially the current collector 9 is drawn out from the take-up roller 18 so as to be moved on the circular can roll 4b, so that the active material evaporated from the evaporation source 3b is deposited on the active material sub-layer 22 on the back-side surface of the current collector 9 in the evaporation area B to thereby form an active material sub-layer 23. In the formation of the active material sub-layer 23, the deposition of the active material at the boundary between the active material sub-layers 22 and 23 is unevenness because the surface 22b of the active material sub-layer 22 involves unevenness such as recesses and projections.

Figure 2E:
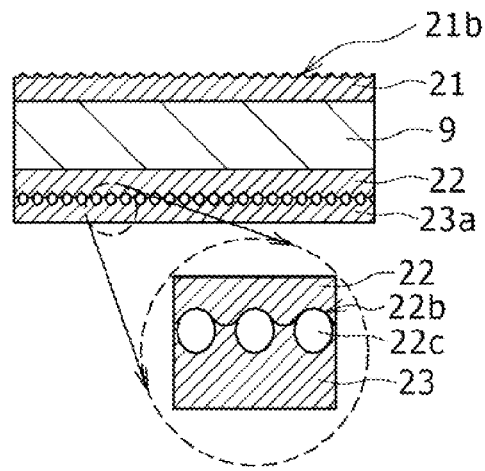

For example, when there are recesses and projections on a surface, the film deposition rate on the projections is high because the supply of an active material thereto is fast, whereas the deposition rate on the recesses is low because the supply of an active material thereto is slow. As a result, the recesses and projections on the surface become more significant and an active material sub-layer grown from the projections hang over the recesses. This prevents the recesses shadowed by the projections from being supplied with the active material (shadow effect). Because shadow-less deposition employing scattering of an evaporated material is difficult in vacuum evaporation, the active material sub-layer hung over from the projections covers the recesses in an arch shape finally. As a result, the recesses are left as fine pores 22c. As shown in FIG. 2E, a large number of fine pores 22c are formed along the boundary between the active material sub-layers 22 and 23. A part of these fine pores 22c communicate with each other to thereby serve as the ion-permeable pores. The diameter of the fine pores 22c along the thickness direction of the active material sub-layer 22 can be controlled depending on the gas flow rate and the movement velocity of the current collector 9. Although the above-described example relates to the case in which the unevenness of the surface 22b is realized by recesses and projections on the surface, the same phenomenon occurs also when this unevenness is physical and/or chemical surface-state unevenness such as variation in the oxygen content among areas.

Figure 2F:
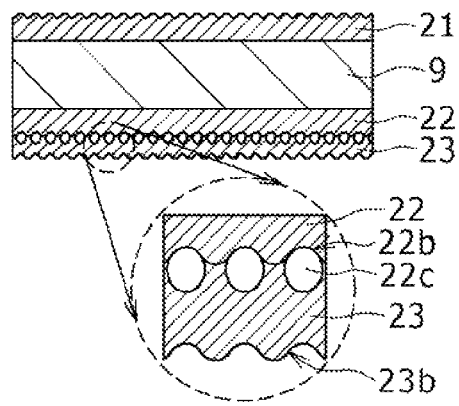

In most part of the evaporation area B, the active material is evenly deposited, so that an active material sub-layer main part 23a is formed as shown in FIG. 2E. Subsequently, in the uneven formation area E near the exit end of the evaporation area B, the active material is unevenly deposited, so that the active material sub-layer 23 having an uneven surface 23b is formed as shown in FIG. 2F.

The current collector 9 that has passed through the uneven formation area E is conveyed to the evaporation area A via the feed roller 17 and the guide rollers 15 and 14. In this conveying, the surface of the current collector 9 facing the evaporation source is "reversed" again from the back-side surface to the front-side surface so that the current collector 9 may be in contact with the circular can roll 4a via its surface (back-side surface) on which the active material sub-layer 23 has been formed in the evaporation area B and the front-side surface thereof may face the evaporation source 3a in the evaporation area A.

The current collector 9 is moved on the circular can roll 4a, so that the active material evaporated from the evaporation source 3a is deposited on the surface of the active material sub-layer 21 in the evaporation area A to thereby form an active material sub-layer 24. Also in this sub-layer formation, the deposition of the active material at the boundary between the active material sub-layers 21 and 24 is unevenness because the active material sub-layer 21 has the uneven surface 21b. Thus, a large number of fine pores 22c are formed along the boundary between the active material sub-layers 21 and 24.

Figure 2G:
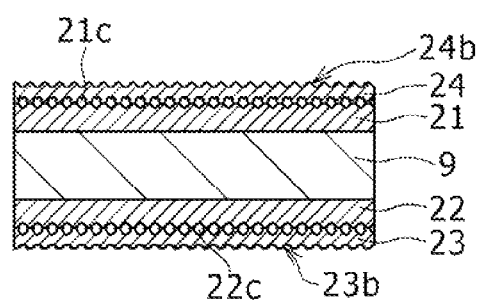
Figure 2H:
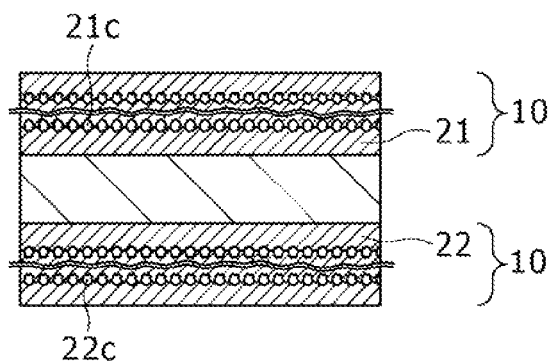

In most part of the evaporation area A, the active material is evenly deposited, so that an active material sub-layer main part is formed. Subsequently, in the uneven formation area F near the exit end of the evaporation area A, the active material is unevenly deposited, so that the active material sub-layer 24 having an uneven surface 24b is formed as shown in FIG. 2G.

The current collector 9 that has passed through the uneven formation area F is wound up by the take-up roller 11. When the entire current collector 9 has been wound up by the take-up roller 11 after being drawn out from the take-up roller 18 in the above-described manner, the active material sub-layers 23 and 24 have been formed in the entire region of the current collector 9.

Thereafter, by repeating the film deposition the necessary number of times with the current collector 9 moved forward and backward, the active material layers 10 can be formed efficiently and easily that arise from the stacking of a predetermined number of active material sub-layers and have a larger number of fine pores communicating with each other along the boundaries between the sub-layers.

Second Embodiment

Figure 3A:
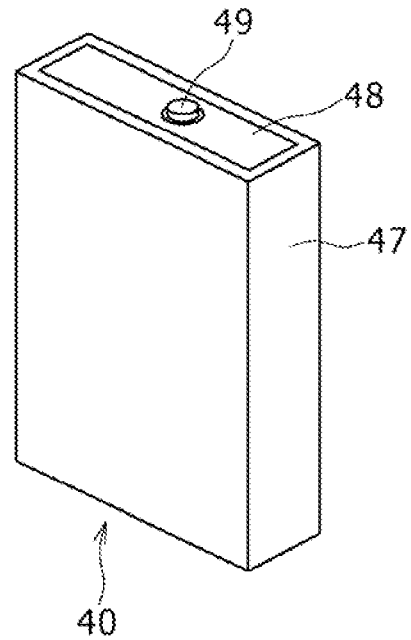
FIGS. 3A and 3B are a perspective view and a sectional view, respectively, showing the structure of a lithium ion secondary battery (having a rectangular shape) based on a second embodiment.
Figure 3B:
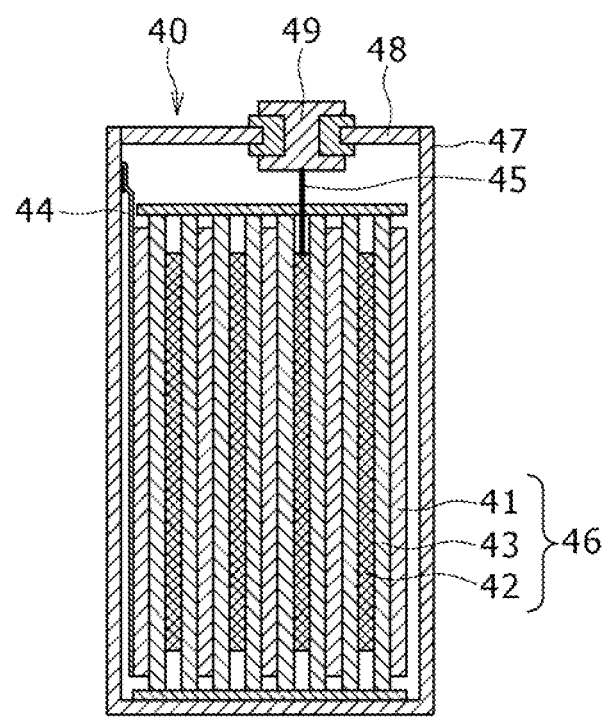

FIGS. 3A and 3B are a perspective view and a sectional view, respectively, showing one example of the structure of a lithium ion secondary battery based on a second embodiment. As shown in FIG. 4, a secondary battery 40 is a rectangular battery. An electrode coil 46 is housed inside a battery can 47 and an electrolyte solution is injected in the battery can 47. The aperture of the battery can 47 is closed by a battery cap 48. The electrode coil 46 is formed by winding a strip anode 41 and a strip cathode 42 that are opposed to each other with the intermediary of a separator (and an electrolyte layer) 43 therebetween along their longitudinal direction. An anode lead terminal 44 routed out from the anode 41 is connected to the battery can 47, and thus the battery can 47 serves also as the anode terminal. A cathode lead terminal 45 routed out from the cathode 42 is connected to a cathode terminal 49.

As the material of the battery can 47 and the battery cap 48, iron, aluminum, nickel, stainless steel, or the like can be used.

The lithium ion secondary battery 40 will be described below.

The anode 41 is formed of an anode current collector and an anode active material layer provided on the anode current collector.

It is preferable that the anode current collector be composed of a metal material that does not form an intermetallic compound with lithium (Li). If the anode current collector is composed of a material that forms an intermetallic compound with lithium, the anode current collector expands/contracts due to reaction with the lithium accompanying charging/discharging. As a result, the structural destruction of the anode current collector occurs, which lowers the current collecting performance. Furthermore, the ability for holding the anode active material layer is lowered, and therefore the anode active material layer is easily separated from the anode current collector.

Examples of the metal element that does not form an intermetallic compound with lithium include copper (Cu), nickel (Ni), titanium (Ti), iron (Fe), and chromium (Cr). In the present specification, the term "metal material" encompasses not only elemental metals but also alloys composed of two or more kinds of metal elements or composed of one or more kinds of metal elements and one or more kinds of metalloid elements (semi-metal elements).

Furthermore, it is preferable that the anode current collector be composed of a metal material containing a metal element that will be bonded to the anode active material layer through alloying or diffusion. If the anode current collector is composed of such a material, the adhesion between the anode active material layer and the anode current collector is enhanced. Thus, the fine-dividing of the anode active material due to expansion/contraction accompanying charging/discharging is suppressed, which prevents the separation of the anode active material layer from the anode current collector. Furthermore, an advantage of improvement in the electron conductivity in the anode 41 is also achieved.

The anode current collector may be formed of either a single layer or plural layers. If the anode current collector is formed of plural layers, it is preferable that the layer in contact with the anode active material layer be composed of a metal material that will be bonded to silicon or tin through alloying or diffusion, and the other layers be composed of a metal material that does not form an intermetallic compound with lithium.

It is preferable that the anode active material layer contain, as an anode active material, at least one of elemental silicon, silicon compounds, elemental tin, and tin compounds. In particular, it is preferable that silicon be contained therein. Silicon is superior in ability for alloying lithium ions and capturing them and ability for discharging alloyed lithium as lithium ions again. In the case of forming a lithium ion secondary battery, silicon can realize high energy density. Silicon may be contained as any of elemental silicon, a silicon alloy, and a silicon compound, or alternatively may be contained as a mixture of two or more kinds of them.

It is preferable that the anode active material layer be a thin film having a thickness of about 4 to 7 μm. Furthermore, it is preferable that a part or all of elemental silicon be bonded to the anode current collector through alloying or diffusion. This is because this bonding can enhance the adhesion between the anode active material layer and the anode current collector as described above. Specifically, it is preferable that, across the interface therebetween, a constituent element of the anode current collector diffuse into the anode active material layer, or a constituent element of the anode active material layer diffuse into the anode current collector, or both diffuse into each other. This is because this diffusion suppresses the separation of the anode active material layer from the anode current collector even when the anode active material layer expands/contracts due to charging/discharging. In the present specification, formation of a solid solution through element diffusion is also encompassed in one form of alloying.

When the active material layer contains elemental tin, it is preferable that a cobalt layer be stacked on the tin layer and both be alloyed through heat treatment after the layer stacking. Such a configuration increases the charging/discharging efficiency and enhances the cycle characteristic. Although detailed reason therefor is unclear, probably the existence of cobalt, which does not react with lithium, would enhance the structural stability of the tin layer under repetition of the charging/discharging reaction.

Copper, nickel, and iron are available as the metal element that does not form an intermetallic compound with lithium but will be bonded to silicon in the anode active material layer through alloying or diffusion. Of these metals, copper is particularly preferable because it can provide an anode current collector having sufficient strength and conductivity.

It is preferable that oxygen be contained in the anode active material layer as a constituent element thereof. This is because oxygen can suppress the expansion and contraction of the anode active material layer and thus can suppress the lowering of the discharge capacity and swelling. It is preferable that at least a part of the oxygen contained in the anode active material layer be coupled to silicon. The coupling state thereof may be the state corresponding to silicon monoxide or silicon dioxide, or alternatively may be another metastable state.

It is preferable that the oxygen content in the anode active material layer be in the range from 3 atomic % to 40 atomic % inclusive. If the oxygen content is lower than 3 atomic %, a sufficient oxygen-containing effect fails to be obtained. In contrast, if the oxygen content is higher than 40 atomic %, the following problems would occur: the lowering of the battery energy capacity, increase in the resistance of the anode active material layer, swelling due to local lithium insertion, and the lowering of the cycle characteristic. Note that a coat formed on the surface of the anode active material layer through decomposition of an electrolyte solution and so on due to charging/discharging is not included in the anode active material layer. Therefore, the oxygen content in the anode active material layer is a value calculated without taking this coat into consideration.

The anode active material layer includes a first layer of which oxygen content is low and a second layer of which oxygen content is higher than that of the first layer. In particular, it is preferable that the first layers and the second layers be alternately formed and at least one second layer exist between the first layers. This is because such a structure can suppress expansion/contraction accompanying charging/discharging more effectively. For example, it is preferable that the silicon content in the first layer be 90 atomic % or higher. Although oxygen may be contained in the first layer or may not, it is preferable that the oxygen content therein be low, and it is more preferable that no oxygen be contained or the oxygen content be very low. This is because lower oxygen content can provide higher discharge capacity. On the other hand, it is preferable that in the second layer, the silicon content be 90 atomic % or lower and the oxygen content be 10 atomic % or higher. This is because such a second layer can suppress the structural destruction due to expansion and contraction more effectively. The first and second layers may be stacked either in the order of the first layer and the second layer or in the order of the second layer and the first layer from the anode current collector side. The surface layer of the anode active material layer may be either the first layer or the second layer. It is preferable that the oxygen content change in a stepwise or continuous manner between the first and second layers. This is because sharp change in the oxygen content often lowers the diffusibility of lithium ions and thus increases the resistance.

The anode active material layer may contain one or more kinds of constituent elements other than silicon and oxygen. Examples of the elements other than silicon and oxygen include titanium (Ti), chromium (Cr), manganese (Mn), iron (Fe), cobalt (Co), nickel (Ni), copper (Cu), zinc (Zn), indium (In), silver (Ag), magnesium (Mg), aluminum (Al), germanium (Ge), tin (Sn), bismuth (Bi), and antimony (Sb).

The cathode 42 is formed of a cathode current collector and a cathode active material layer provided on the cathode current collector.

It is preferable that the cathode current collector be composed of a metal material such as aluminum, nickel, or stainless steel.

It is preferable that the cathode active material layer contain, as a cathode active material, e.g. one or more kinds of materials that can discharge lithium ions at the time of discharging and can reabsorb lithium ions at the time of charging, and contain an electric conductor such as a carbon material and a binder such as poly(vinylidene fluoride) according to need.

As the material that can discharge and reabsorb lithium ions, e.g. a lithium-transition metal composite oxide that contains lithium and a transition metal element M and is expressed by the general formula $Li_xMO_2$ is preferable. This is because, in the case of forming a lithium ion secondary battery, the lithium-transition metal composite oxide can generate large electromotive force and can realize further enhancement in the capacity of the secondary battery because the lithium-transition metal composite oxide has a high density. M denotes one or more kinds of transition metal elements, and it is preferable that M be at least one of e.g. cobalt, nickel, and manganese. x in the formula $Li_xMO_2$ differs depending on the charging state (discharging state) of the battery, and is generally in the range of $0.05 \leq x \leq 1.10$. Specific examples of such a lithium-transition metal composite oxide include $LiCoO_2$, $LiNiO_2$, and $LiMn_2O_4$, which have a spinel structure.

When a granular lithium-transition metal composite oxide is used as the cathode active material, powders of this oxide may be used as they are. Alternatively, on at least a part of the granular lithium-transition metal composite oxide, a surface layer may be provided that contains at least one selected from the group consisting of oxides having a composition different from that of this lithium-transition metal composite oxide, halogenides, phosphates, and hydrosulfates. This is because the provision of such a surface layer can improve stability and suppress the lowering of the discharge capacity more effectively. In the case of providing a surface layer, both a constituent element of the surface layer and a constituent element of the lithium-transition metal composite oxide may diffuse into the opposite layer.

Furthermore, it is preferable that the cathode active material layer contain at least one selected from the group consisting of elementary substances and compounds of the Group 2 elements, the Group 3 elements, and the Group 4 elements in the long-period periodic table. This is because such a cathode active material layer can improve stability and suppress the lowering of the discharge capacity more effectively. Examples of the Group 2 elements include magnesium (Mg), calcium (Ca), and strontium (Sr). Among them, magnesium is preferable. Examples of the Group 3 elements include scandium (Sc) and yttrium (Y). Among them, yttrium is preferable. Examples of the Group 4 elements include titanium and zirconium (Zr). Among them, zirconium is preferable. These elements may be solid-dissolved in the cathode active material. Alternatively, they may exist as an elementary substance or compound at the grain boundaries of the cathode active material.

The separator 43 isolates the anode 41 from the cathode 42 to thereby prevent current short-circuit due to contact between these electrodes, and allows the passage of lithium ions therethrough. As the material of the separator 43, e.g. a thin film of microporous polyethylene or polypropylene in which a large number of small pores are formed is preferable.

The electrolyte solution is composed of e.g. a solvent and an electrolyte salt dissolved in this solvent, and may contain an additive agent according to need.

Examples of the solvent of the electrolyte solution include cyclic carbonate esters such as 1,3-dioxolan-2-one (ethylene carbonate (EC)) and 4-methyl-1,3-dioxolan-2-one (propylene carbonate (PC)), chain carbonate esters such as dimethyl carbonate (DMC), diethyl carbonate (DEC), and ethylmethyl carbonate (EMC), and non-aqueous solvents such as γ-butyrolactone. Although any one kind of these substances may be used alone as the solvent, it is preferable to use a mixture of any two or more kinds of these substances. For example, by using a mixture of a high-dielectric-constant solvent such as ethylene carbonate or propylene carbonate and a low-viscosity solvent such as dimethyl carbonate, diethyl carbonate, or ethylmethyl carbonate, both high solubility for an electrolyte salt and high ion conductivity can be realized.

Furthermore, the solvent may contain sultone. This is because such a solvent enhances the stability of the electrolyte solution and thus can suppress battery swelling due to decomposition reaction and so on. As sultone, a substance having an unsaturated bond in the ring is preferable. In particular, 1,3-propene sultone (PRS), of which structural formula is shown below, is preferable. This is because this substance can provide higher advantageous effects.

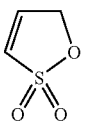

In addition, it is preferable that the solvent be mixed with a cyclic carbonate ester having an unsaturated bond, such as 1,3-dioxol-2-one (vinylene carbonate (VC)) or 4-vinyl-1,3-dioxolan-2-one (VEC). This is because such a solvent can suppress the lowering of the discharge capacity more effectively. In particular, using both VC and VEC is preferable because higher advantageous effects can be achieved.

Moreover, a carbonate ester derivative having a halogen atom may be mixed in the solvent. This is because such a solvent can suppress the lowering of the discharge capacity. In the case of mixing a carbonate ester derivative, it is more preferable that a cyclic carbonate ester having an unsaturated bond be also mixed in the solvent. This is because such a solvent can provide higher advantageous effects. Although the carbonate ester derivative having a halogen atom may be either a cyclic compound or chain compound, a cyclic compound is more preferable because higher advantageous effects can be achieved. Examples of such a cyclic compound include 4-fluoro-1,3-dioxolan-2-one (FEC), 4-chloro-1,3-dioxolan-2-one, 4-bromo-1,3-dioxolan-2-one, and 4,5-difluoro-1,3-dioxolan-2-one (DFEC). Among them, DFEC and FEC having a fluorine atom are preferable, and DFEC is preferable in particular. This is because DFEC can provide higher advantageous effects.

Examples of the electrolyte salt of the electrolyte solution include lithium salts such as lithium hexafluorophosphate ($LiPF_6$), lithium tetrafluoroborate ($LiBF_4$), lithium perchlorate ($LiClO_4$), lithium trifluoromethanesulfonate ($CF_3SO_3Li$), and lithium bis(trifluoromethane sulfone)imide ($LiN(SO_2CF_3)_2$). As the electrolyte salt, any one kind of these substances may be used alone, or alternatively a mixture of any two or more kinds of these substances may be used.

The electrolyte solution may be used as it is. Alternatively, it may be held by a high molecular compound so as to be used as a gel electrolyte solution. In the case of a gel electrolyte solution, the separator 43 may be impregnated with the electrolyte solution, or alternatively the electrolyte solution may exist as a layer between the separator 43 and the anode 41 or the cathode 42. As the high molecular material, e.g. a polymer containing vinylidene fluoride is preferable. This is because the oxidation/reduction stability thereof is high. Furthermore, as the high molecular compound, a compound formed through polymerization of a polymerizable compound is also preferable. Examples of the polymerizable compound include monofunctional acrylate such as acrylic acid ester, monofunctional methacrylate such as methacrylic acid ester, multifunctional acrylate such as diacrylic acid ester and triacrylic acid ester, multifunctional methacrylate such as dimethacrylic acid ester and trimethacrylic acid ester, acrylonitrile, and methacrylonitrile. Among them, an ester having an acrylate group or methacrylate group is preferable. This is because polymerization of such an ester readily proceeds and the reactivity thereof is high.

The lithium ion secondary battery 40 can be manufactured in the following manner for example.

Initially, in the above-described manner in the first embodiment, the anode 41 is fabricated by forming an active material layer on a current collector and cutting the current collector into a predetermined shape.

Subsequently, a cathode active material layer is formed on a cathode current collector. Specifically, for example, a mixture is prepared by mixing a cathode active material with an electric conductor and a binder according to need, and the mixture is dispersed in a dispersion medium such as N-methylpyrrolidone (NMP) so as to be turned to mixture slurry. This mixture slurry is applied on the cathode current collector and then is compression-molded to thereby form the cathode 42.

Subsequently, the electrode coil 46 is formed by winding the anode 41 and the cathode 42 that are opposed to each other with the intermediary of the separator 43 therebetween in such a way that the direction along the short sides of the anode 41 and the cathode 42 is parallel to the winding axis direction. The anode 41 and the cathode 42 are so disposed that the anode active material layer and the cathode active material layer face each other. Subsequently, the electrode coil 46 is inserted into the battery can 47 having a rectangular shape, and the battery cap 48 is welded to the aperture of the battery can 47. Subsequently, an electrolyte solution is injected through an electrolyte solution filling port formed in the battery cap 48, followed by closing of the filling port. In the above-described manner, the rectangular lithium ion secondary battery 40 is assembled.

It is also possible to use a container formed of an outer case such as a laminate film. A polymerizable compound may be polymerized in the container after injecting the polymerizable compound together with the electrolyte solution. Furthermore, before the winding of the anode 41 and the cathode 42, the anode 41 and the cathode 42 may be coated with a gel electrolyte solution by a coating method or the like, and thereafter the anode 41 and the cathode 42 may be wound with the intermediary of the separator 43 therebetween.

After the battery assembling, in charging of the lithium ion secondary battery 40, lithium ions are discharged from the cathode 42 and move toward the anode 41 through the electrolyte solution, followed by being captured by the anode 41. In discharging, the lithium captured by the anode 41 is discharged again as lithium ions, so that the lithium ions move toward the cathode 42 through the electrolyte solution and are absorbed by the cathode 42 again.

In this lithium ion secondary battery 40, the anode active material layer contains at least one of elemental silicon, silicon compounds, elemental tin, and tin compounds as the anode active material. This can enhance the capacity of the secondary battery.

WORKING EXAMPLES

Specific working examples will be described in detail below according to embodiments. In the following description for the working examples, numerals and symbols used in the description of the embodiments are used in a matched manner as they are.

In each working example, a battery electrode was formed by the method described for the first embodiment. Subsequently, by using this electrode as the anode 41, the rectangular lithium ion secondary battery 40 shown in FIGS. 3A and 3B according to the second embodiment was fabricated, and the load characteristic of the battery 40 was measured.

<Formation of Anode 41>

As vacuum evaporation apparatus, the electrode forming apparatus 1 (see FIGS. 1A and 1B) including evaporation sources based on heating by a deflected electron beam was used. As the current collector 9, a strip electrolytic copper foil having a thickness of 24 μm was used. Both the surfaces of this foil had been roughened. Unless there is a particular note in the description, the surface roughness Rz of the current collector 9 was 2.5 μm. Furthermore, unless there is a particular note in the description, a silicon single crystal was used as the active material. Film deposition was carried out with the current collector 9 moved forward and backward as shown in FIGS. 1A and 1B. By this operation, the active material layer 10 obtained by stacking eight active material sub-layers was formed. The film deposition rate was 100 nm/s, and the thickness of the formed active material layer 10 was about 5 to 6 μm.

As the gas, an argon (Ar), carbon dioxide ($CO_2$), or oxygen ($O_2$) gas was used. As described above, the gas was sprayed from the gas injection nozzles 20*c* to 20*f* shown in FIGS. 1A and 1B at a predetermined flow rate (5 to 500 sccm (cc/min)), so that fine pores were formed at the boundaries between the active material sub-layers. The fine pore diameter along the thickness direction of the active material layer 10 was controlled depending on the gas flow rate and the movement velocity of the electrolytic copper foil. It is important that the flow of the vapor of the active material to be evaporated be disturbed in the vicinity of the current collector 9, and the kind of gas is not limited to the above-described gases. Furthermore, although the gas introduction positions are also not limited to the positions shown in FIGS. 1A and 1B, it is preferable that the gas be introduced to positions near the current collector 9 because fine pores are readily formed.

The outline of Working examples 1 to 16 and 21 is as follows.

Working Examples 1 to 6 and Comparative Examples 1 to 3

In Working examples 1 to 6, an argon gas was injected as the gas at a gas flow rate of 8, 10, 30, 150, 230, and 400 sccm, respectively, and thereby fine pore groups were formed in which the pore diameter along the thickness direction of the active material layer 10 was 3, 5, 10, 70, 150, and 300 nm, respectively. Also in Comparative example 1, an argon gas was introduced. However, the argon gas was introduced into the flow of the active material vapor at a low flow rate from gas inlets 50*a* and 50*b* provided at positions that are far from the evaporation areas A and B and comparatively close to the evaporation sources 3*a* and 3*b* as shown in FIGS. 1A and 1B. Thus, no fine pore was formed. In Comparative examples 2 and 3, an argon gas was injected as the gas at a gas flow rate of 500 and 620 sccm, respectively, and thereby fine pore groups were formed in which the pore diameter along the thickness direction of the active material layer 10 was 350 and 400 nm, respectively.

Working Examples 7 to 9

In Working example 7, a carbon dioxide gas was injected as the gas at a gas flow rate of 100 sccm, and thereby fine pore groups were formed in which the pore diameter along the thickness direction of the active material layer 10 was 70 nm. In Working example 8, an oxygen gas was injected as the gas at a gas flow rate of 200 sccm, and thereby fine pore groups were formed in which the pore diameter along the thickness direction of the active material layer 10 was 70 nm. In Working example 9, instead of employing the gas injection, the irradiation area of the electron beam in the evaporation sources was changed, and thereby the film deposition rate was changed in the range of 50 to 150 nm/s, which offered uneven evaporation. As a result, fine pore groups were formed in which the pore diameter along the thickness direction of the active material layer 10 was 70 nm. When fine pores are formed by injecting the gas at the same gas flow rate, the diameter of the fine pores along the thickness direction of the active material layer 10 changes depending on the kind of gas, and has a magnitude relationship of $O_2<Ar<CO_2$.

Working Examples 10 to 16 and Comparative Examples 4 to 10

In Working examples 10 to 16, as the anode current collector, an electrolytic copper foil of which surface roughness Rz was 1.8, 2.0, 2.9, 3.5, 4.1, 4.5, and 4.8 μm, respectively, was used. In each of Working examples 10 to 16, the diameter of fine pores along the thickness direction of the active material layer 10 was set to 70 nm, which was the same as that in Working example 4. To obtain this diameter value, an argon gas was injected as the gas at a gas flow rate of 150, 150, 150, 140, 130, 120, and 120 sccm, respectively. When the surface roughness of the current collector 9 is changed, the gas flow rate necessary to form fine pores also somewhat changes. In Comparative examples 4 to 10, as the anode current collector, an electrolytic copper foil of which surface roughness was 1.8, 2.0, 2.9, 3.5, 4.1, 4.5, and 4.8 μm, respectively, was used. In Comparative examples 4 to 10, similarly to Comparative example 1, no fine pore was formed although an argon gas was introduced.

Working Example 21 and Comparative Example 15

In Working example 21 and Comparative example 15, tin was used as the active material, and the active material layer obtained by stacking eight active material sub-layers was formed through film deposition with forward and backward movement. In Working example 21, an argon gas was sprayed at a gas flow rate of 250 sccm, and thereby fine pore groups in which the pore diameter along the thickness direction of the active material layer 10 was 70 nm were formed along the boundaries between the active material sub-layers. In Comparative example 15, no fine pore was formed although an argon gas was introduced.

<Fabrication of Lithium Ion Secondary Battery 40>

Initially, the anode 41 was fabricated by using the above-described battery electrode. Subsequently, a mixture was prepared by mixing powders of lithium cobalt oxide ($LiCoO_2$) having an average particle size of 5 μm as the cathode active material, carbon black as an electric conductor, and poly (vinylidene fluoride) (PVdF) as a binder. The mass ratio of $LiCoO_2$:carbon black:PVdF in the mixture was 92:3:5. This mixture was dispersed in N-methylpyrrolidone (NMP) as a dispersion medium so as to be turned to mixture slurry. This mixture slurry was applied on a cathode current collector formed of an aluminum foil with a thickness of 15 μm, and then the dispersion medium was evaporated and the mixture was dried. Thereafter, the mixture was pressed for compression molding to thereby form the cathode active material layer, so that the cathode 42 was fabricated.

Subsequently, the electrode coil 46 was fabricated by winding the anode 41 and the cathode 42 opposed to each other with the intermediary of the separator 43 therebetween. As the separator 43, a multilayer polymer separator having a thickness of 23 μm was used. This multilayer polymer separator had a structure obtained by interposing a core film composed mainly of microporous polyethylene between films composed mainly of microporous polypropylene.

Subsequently, the electrode coil 46 was inserted into the battery can 47 having a rectangular shape, and the battery cap 48 was welded to the aperture of the battery can 47. Subsequently, an electrolyte solution was injected through an electrolyte solution filling port formed in the battery cap 48, and then the filling port was closed, so that the lithium ion secondary battery 40 was assembled.

For the electrolyte solution, 4-fluoro-1,3-dioxolan-2-one (fluoroethylene carbonate (FEC)) and diethyl carbonate (DEC) were mixed at a mass ratio of FEC:DEC=30:70, to thereby prepare a mixture solvent (abbreviated as FEC/DEC in Tables 1 to 3 and 5). Subsequently, a solution was prepared by dissolving $LiPF_6$ as an electrolyte salt with a concentration of 1 mol/dm$^3$ in this mixture solvent. This solution was used as the standard electrolyte solution.

Working Examples 17 to 19 and Comparative Examples 11 to 13

In Working examples 17 and 18, similarly to Working example 4, a secondary battery electrode with the active material layer 10 that had fine pores of which diameter along the thickness direction of the active material layer 10 was 70 nm was used. However, instead of the standard electrolyte, an electrolyte prepared by using a different solvent was used. Specifically, in Working example 17, a mixture solvent prepared by mixing DFEC and DEC at a mass ratio of DFEC:DEC=30:70 was used (abbreviated as DFEC/DEC in Table 4). In Working example 18, a mixture solvent prepared by mixing EC, DEC, and VC at a mass ratio of EC:DEC:VC=30:60:10 was used (abbreviated as EC/DEC/VC in Table 4). In Working example 19, similarly to Working example 5, a secondary battery electrode with the active material layer 10 that had fine pores of which diameter along the thickness direction of the active material layer 10 was 150 nm was used. However, instead of the standard electrolyte, an electrolyte with a mixture solvent prepared by mixing EC, DEC, VC, and PRS at a mass ratio of EC:DEC:VC:PRS=30:60:9:1 (abbreviated as "with PRS" in Table 4) was used. As described above, DFEC denotes 4,5-difluoro-1,3-dioxolan-2-one (difluoroethylene carbonate), EC denotes ethylene carbonate, VC denotes vinylene carbonate, and PRS denotes 1,3-propene sultone.

In Comparative examples 11 to 13, similarly to Comparative example 1, no fine pore was formed although an argon gas was introduced at a gas flow rate of 50 sccm. In Comparative examples 11 to 13, the electrolytes employing the same mixture solvents as those in Working examples 17 to 19, respectively, were used.

<Evaluation of Lithium Ion Secondary Battery>

A charge/discharge test was carried out at 25° C. on the fabricated secondary batteries 40 of the working examples and comparative examples, to thereby measure the load characteristic of the batteries 40. In this charge/discharge test, except for Working example 20 and Comparative example 14 to be described later, only in the first one cycle, initially charging was carried out with a constant current density of 0.2 mA/cm$^2$ until the battery voltage reached 4.2 V, and then continuously charging was carried out with a constant voltage of 4.2 V until the current density reached 0.05 mA/cm$^2$. Subsequently, discharging was carried out with a constant current of 0.2 mA/cm$^2$ until the battery voltage became 2.5 V.

In each one cycle subsequent to the first cycle, initially charging was carried out with a current density of 0.2 C with respect to the battery capacity until the battery voltage reached 4.2 V, and then continuously charging was carried out with a constant voltage of 4.2 V until the current density became 0.1 mA/cm$^2$. Subsequently, discharging was carried out with a current density of 0.2 C with respect to the battery capacity until the battery voltage became 2.5 V.

In the measurement of the load characteristic, initially charging was carried out with a current density of 0.2 C with respect to the battery capacity until the battery voltage reached 4.2 V, and then continuously charging was carried out with a constant voltage of 4.2 V until the current density became 0.1 mA/cm$^2$. Subsequently, discharging was carried out with a current density of 2 C with respect to the battery capacity until the battery voltage became 2.5 V.

As the load characteristic, the value defined by the following equation was measured. That is, the measured load characteristic was the ratio of the discharge capacity at 2 C to the discharge capacity at 0.2 C.

load characteristic(%)=(discharge capacity at 2 C/discharge capacity at 0.2 C)*100(%)

Working Example 20 and Comparative Example 14

In Working example 20, similarly to Working example 4, a secondary battery electrode with the active material layer 10 that had fine pores of which diameter along the thickness direction of the active material layer 10 was 70 nm was used, and a secondary battery was fabricated by using the standard electrolyte. However, the first charging was carried out, initially with a constant current density of 0.07 mA/cm$^2$ until the battery voltage reached 4.2 V, and then with a constant voltage of 4.2 V until the current density reached 0.05 mA/cm$^2$. In Comparative example 14, no fine pore was formed although an argon gas was introduced. Except for this feature, the conditions of the secondary battery fabrication and the first charging were the same as those in Working example 20.

The test results on the above-described examples are shown below in Tables 1 to 5.

TABLE 1

| | Kind of gas | Gas flow rate (sccm) | Fine pore diameter (nm) | Load characterristic (%) | Surface roughness of current collector (μm) | Solvent of electrolyte |
|---|---|---|---|---|---|---|
| Working example 1 | Ar | 8 | 3 | 87 | 2.5 | FEC/DEC |

TABLE 1-continued

|  | Kind of gas | Gas flow rate (sccm) | Fine pore diameter (nm) | Load characterristic (%) | Surface roughness of current collector (μm) | Solvent of electrolyte |
|---|---|---|---|---|---|---|
| Working example 2 | Ar | 10 | 5 | 87 | 2.5 | FEC/DEC |
| Working example 3 | Ar | 30 | 10 | 91 | 2.5 | FEC/DEC |
| Working example 4 | Ar | 150 | 70 | 96 | 2.5 | FEC/DEC |
| Working example 5 | Ar | 230 | 150 | 95 | 2.5 | FEC/DEC |
| Working example 6 | Ar | 400 | 300 | 91 | 2.5 | FEC/DEC |
| Comparative example 1 | Ar |  | — | 84 | 2.5 | FEC/DEC |
| Comparative example 2 | Ar | 500 | 350 | 56 | 2.5 | FEC/DEC |
| Comparative example 3 | Ar | 620 | 400 | 43 | 2.5 | FEC/DEC |

TABLE 2

|  | Kind of gas | Gas flow rate (sccm) | Fine pore diameter (nm) | Load characterristic (%) | Surface roughness of current collector (μm) | Solvent of electrolyte |
|---|---|---|---|---|---|---|
| Working example 7 | $CO_2$ | 100 | 70 | 95 | 2.5 | FEC/DEC |
| Working example 8 | $O_2$ | 200 | 70 | 96 | 2.5 | FEC/DEC |
| Working example 9 |  | (irradiation area of electron beam in evaporation source is changed) | 70 | 94 | 2.5 | FEC/DEC |

TABLE 3

|  | Kind of gas | Gas flow rate (sccm) | Fine pore diameter (nm) | Load characterristic (%) | Surface roughness of current collector (μm) | Solvent of electrolyte |
|---|---|---|---|---|---|---|
| Working example 10 | Ar | 150 | 70 | 87 | 1.8 | FEC/DEC |
| Working example 11 | Ar | 150 | 70 | 92 | 2.0 | FEC/DEC |
| Working example 12 | Ar | 150 | 70 | 94 | 2.9 | FEC/DEC |
| Working example 13 | Ar | 140 | 70 | 95 | 3.5 | FEC/DEC |
| Working example 14 | Ar | 130 | 70 | 94 | 4.1 | FEC/DEC |
| Working example 15 | Ar | 120 | 70 | 93 | 4.5 | FEC/DEC |
| Working example 16 | Ar | 120 | 70 | 89 | 4.8 | FEC/DEC |
| Comparative example 4 | Ar |  | — | 82 | 1.8 | FEC/DEC |
| Comparative example 5 | Ar |  | — | 84 | 2.0 | FEC/DEC |
| Comparative example 6 | Ar |  | — | 84 | 2.9 | FEC/DEC |
| Comparative example 7 | Ar |  | — | 83 | 3.5 | FEC/DEC |
| Comparative example 8 | Ar |  | — | 83 | 4.1 | FEC/DEC |

TABLE 3-continued

|  | Kind of gas | Gas flow rate (sccm) | Fine pore diameter (nm) | Load characteristic (%) | Surface roughness of current collector (μm) | Solvent of electrolyte |
|---|---|---|---|---|---|---|
| Comparative example 9 | Ar |  | — | 82 | 4.5 | FEC/DEC |
| Comparative example 10 | Ar |  | — | 80 | 4.8 | FEC/DEC |

TABLE 4

|  | Kind of gas | Gas flow rate (sccm) | Fine pore diameter (nm) | Load characteristic (%) | Surface roughness of current collector (μm) | Solvent of electrolyte |
|---|---|---|---|---|---|---|
| Working example 17 | Ar | 150 | 70 | 97 | 2.5 | DFEC/DEC |
| Working example 18 | Ar | 150 | 70 | 86 | 2.5 | EC/DEC/VC |
| Working example 19 | Ar | 230 | 150 | 93 | 2.5 | with PRS |
| Comparative example 11 | Ar | 50 | — | 84 | 2.5 | DFEC/DEC |
| Comparative example 12 | Ar | 50 | — | 80 | 2.5 | EC/DEC/V |
| Comparative example 13 | Ar | 50 | — | 82 | 2.5 | with PRS |

TABLE 5

|  | Kind of gas | Gas flow rate (sccm) | Fine pore diamenter (nm) | Load characteristic (%) | Surface roughness of current collector (μm) | Solvent of electrolyte |
|---|---|---|---|---|---|---|
| Working example 20 | Ar | 150 | 70 | 97 | 2.5 | FEC/DEC |
| Comparative example 14 | Ar |  | — | 84 | 2.5 | FEC/DEC |
| Working example 21 | Ar | 250 | 70 | 92 | 2.5 | FEC/DEC |
| Comparative example 15 | Ar |  | — | 82 | 2.5 | FEC/DEC |

In the tables, the item "Fine pore diameter" refers to the diameter of fine pores along the thickness direction of the active material layer. For the pore diameter measurement for the respective working and comparative examples, a section of the active material layer 10 was obtained by cutting the layer 10 by a focused ion beam (FIB) method. Of active material grains in the active material layer 10, particularly an active material grain that was cut along its center was observed in an enlarged manner by a scanning electron microscopy (SEM) at a magnification of 40000-fold or higher. In this enlarged observation, length measurement was carried out, and the diameter of fine pores was obtained as the average of the diameters of adjacent ten fine pores in the section.

Figure 4A:
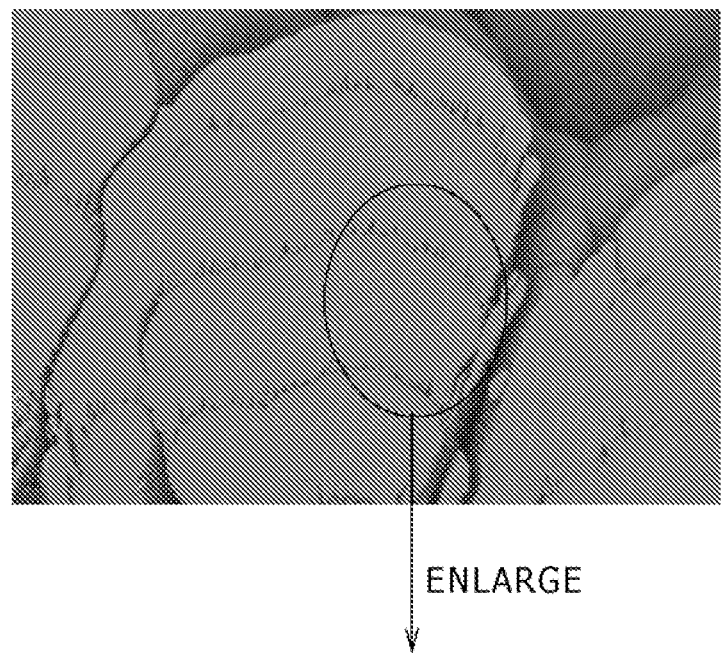
FIGS. 4A and 4B show images obtained by observing, by a scanning electron microscopy (SEM), a section of an active material layer of a secondary battery electrode according to a working example of the present application.
Figure 4B:
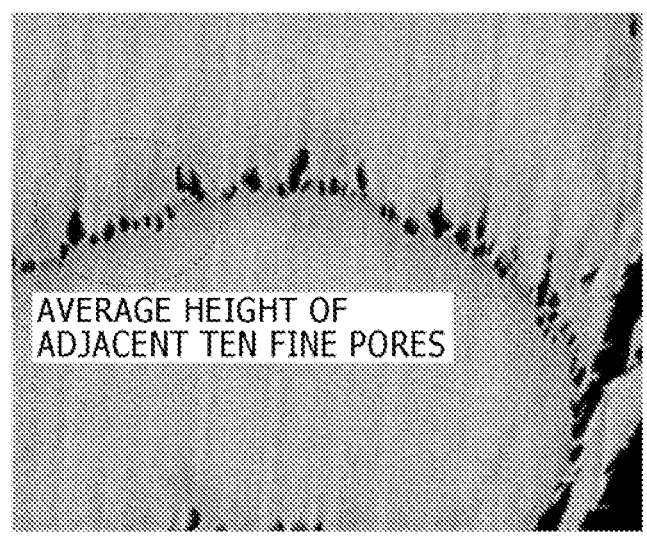

FIGS. 4A and 4B show images obtained by the SEM observation of a section of the active material layer 10 of the secondary battery electrode according to Working example 4. In each of the secondary battery electrodes according to the respective working and comparative examples, the active material layer is formed in such a way that a large number of active material grains with a lump shape or column shape are bonded to the current collector. That is, the active material layer is formed as an aggregate of active material grains that are so arranged as to cover the current collector surface, with slight gaps left thereamong. FIG. 4A is an observation image of a section of an active material grain, and indicates that the active material layer 10 of the active material grain is formed of stacked active material sub-layers and fine pores are formed along the boundaries between the sub-layers. FIG. 4B is an enlarged view of fine pores including adjacent ten fine pores that were used to calculate the average of the fine pore diameters. In FIG. 4B, the respective fine pores look isolated from each other. However, actually many fine pores communicate with each other. Upon assembling of a secondary battery, the insides of the fine pores are filled with the electrolyte and/or the product arising from reduction of the electrolyte, and thus serve as electric conduction paths that allow the passage of electrolyte ions therethrough.

For all of the electrodes, a section of the active material layer 10 was observed by a scanning electron microscopy (SEM) before a secondary battery was assembled, and it was confirmed that the active material layer 10 had fine pores with the intended diameter. Between Working examples 4 and 20, which both obtained the same fine pore diameter but employed different first-charging current densities, comparison was made regarding the state of fine pores on an anode section obtained after the first charging/discharging by using SEM observation images. As a result, in Working example 4, in which the first-charging current density was higher, fine pores were completely filled with the reduction product of the electrolyte. In contrast, in Working example 20, in which the first-charging current density was lower, fine pores were not completely filled with the reduction product of the electrolyte.

As shown in this example, the electrolyte solution enters fine pores, and the electrolyte is reduced to the reduction product thereof at the time of charging. Thus, the insides of the fine pores are gradually filled with an organic substance as the reduction product. Depending on the size of the fine pores, the fine pores will disappear in one to several cycles. However, this reduction product has an effective function of forming electric conduction paths that allow the passage of lithium ions therethrough to thereby enhance the load characteristic. Therefore, the favorable load characteristic of the battery is maintained. This reduction product will be the same as a substance produced on the anode and referred to as a "coat" generally. Eventually, the fine pore is one of measures for making an organic layer composed of the reduction product, and it is most important that an organic layer serving as electric conduction paths that allow the passage of lithium ions therethrough be formed in the fine pores.

Figure 5A:
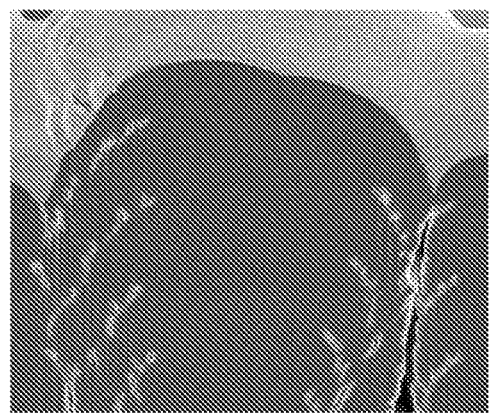
FIGS. 5A and 5B show images obtained by observing, by a scanning electron microscopy (SEM), sections of active material layers of secondary battery electrodes according to other working examples of the present application.
Figure 5B:
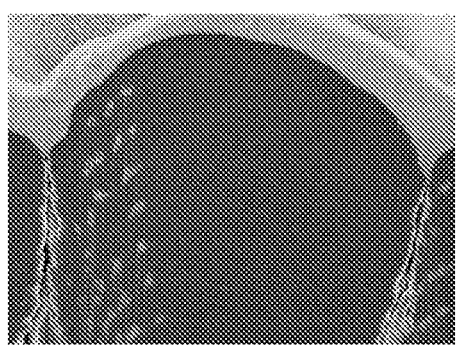

FIGS. 5A and 5B shows images obtained by SEM observation of sections of the active material layers 10 of the secondary battery electrodes according to other working examples. Fine pores do not need to segment the active material layer, but it is sufficient for the active material layer to have fine pores locally. For example, FIG. 5A shows an example in which an anode with an active material layer that has staggered fine pores is fabricated through adjustment of the current collector movement direction and the gas spraying direction. FIG. 5B shows an example in which an active material layer that has fine pores only on its one side is fabricated. The effective pore state is not limited to the example in which the active material layer 10 is segmented into "layers" by fine pores like Working example 4 shown in FIGS. 4A and 4B, but fine pores may be formed in a staggered manner or only on one side as shown in FIGS. 5A and 5B.

Figure 6A:
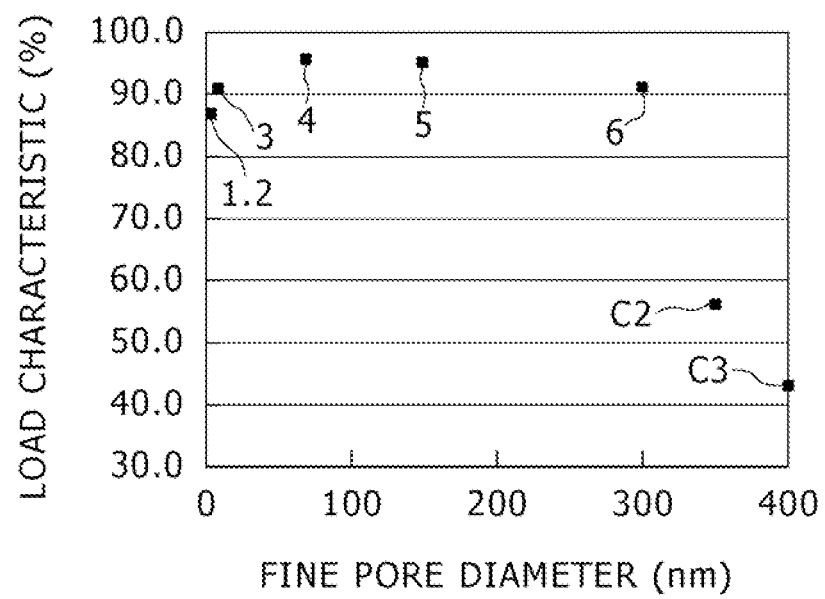
FIGS. 6A and 6B are graphs showing the relationships between the fine pore diameter and the load characteristic and between the surface roughness of a copper foil and the load characteristic according to working examples of the present application.
Figure 6B:
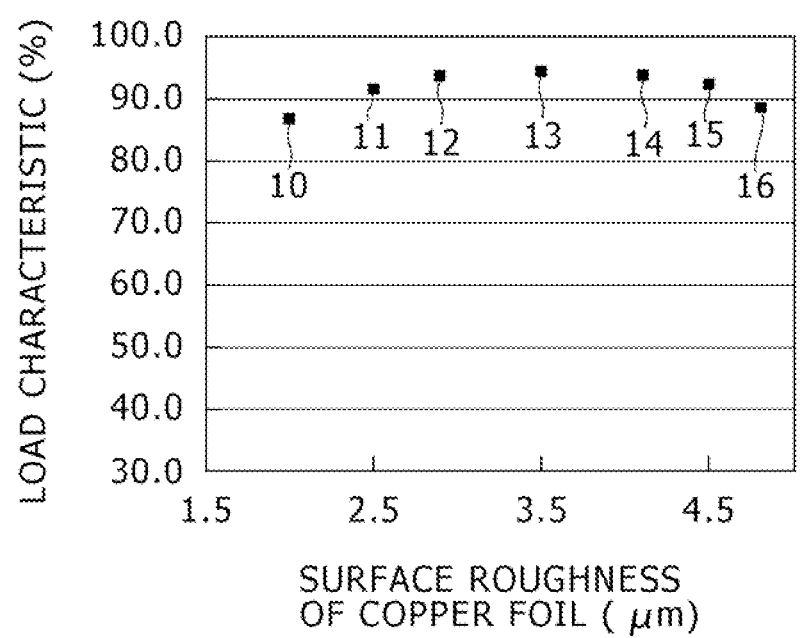

FIGS. 6A and 6B are graphs showing the relationships between the fine pore diameter and the load characteristic in Working examples 1 to 6 and Comparative examples 2 and 3. In the diagram, numerals 1 to 6 given to the data points of the working examples each indicate the number of the working example. The numerals in C2 and C3 given to the data points of the comparative examples each indicate the number of the comparative example. These examples prove that, the load characteristic is enhanced if groups of fine pores having a diameter of 3 to 300 nm are formed in the active material layer. In addition, it is proved that a pore diameter smaller than 3 nm offers no specific effect and a pore diameter over 300 nm lowers the capacity when the load is heavy due to electrode separation. For example, when the fine pore diameter is too large like Comparative example 3, the degree of formation of a coat originating from the reduction product of the electrolyte solution is very high, which lowers the load characteristic.

Furthermore, comparison among Working examples 7 to 9 and Comparative example 1 proves that the effect by the formation of fine pores in the active material layer does not depend on the method for forming the fine pores.

FIG. 6B is a graph showing the relationships between the surface roughness of the electrolytic copper foil and the load characteristic in Working examples 10 to 16. In the diagram, numerals 10 to 16 given to the data points of the working examples each indicate the number of the working example. From comparison among Working examples 10 to 16 and Comparative examples 4 to 10, it is proved that the effect by the formation of fine pores in the active material layer does not depend on the surface roughness of the current collector over which the fine pores are formed, but the effect is particularly effective when Rz is in the range of 2.0 to 4.5 µm. This will be because, at the time of expansion/contraction of the active material, the fine pore layers between the sub-layers function particularly effectively against cracks in the electrode in this roughness range.

In addition, from comparison among Working examples 4, 17, and 18 and Comparative examples 1, 11, and 12, it is proved that the effect by the formation of fine pores in the active material layer is more effective when the electrolyte contains a compound obtained by substituting fluorine for a part or all of hydrogen in a cyclic carbonate ester or chain carbonate ester.

Furthermore, comparison among Working examples 5 and 19 and Comparative examples 1 and 13 proves that the effect by the formation of fine pores in the active material layer is more effective when the electrolyte contains a compound having an S=O bond, such as sultone.

Moreover, Working example 20 and Comparative example 14 prove that fine pore groups will disappear after the first charging depending on the charging condition, but the effect to enhance the load characteristic remains also in this case.

Furthermore, Working example 21 and Comparative example 15 prove that the effect by the formation of fine pores in the active material layer is effective also when a tin-based anode is used.

This is the end of the description based on embodiments and working examples of the application. The present application is not limited to the above-described embodiments and working examples but can be variously modified.

For example, the method for forming an anode active material layer is not particularly limited, but any method is available as long as the method can form an active material layer on the surface of an anode current collector. Examples of the method include vapor-phase methods, baking methods, and liquid-phase methods. As the vapor-phase method, instead of vacuum evaporation, any of sputtering, ion-plating, laser ablation, chemical vapor deposition (CVD), and splaying may be used. Examples of the liquid-phase method include plating. Furthermore, two or more of these methods and further other methods may be combined for the deposition of an active material layer.

In the above-described embodiments and working examples, a rectangular can is used as the battery outer case. However, embodiments can be applied also to the case of using a film material as the outer case. The outer case may have any shape such as a rectangular, coin, cylinder, button, thin film, or large size shape. Furthermore, the outer case can be similarly applied also to a stacked-type battery in which plural anodes and cathodes are stacked.

The secondary battery according to the embodiment includes elemental silicon or another substance as its anode active material and realizes high energy capacity and a favorable cycle characteristic, to whereby contribute to reduction in the size, weight, and thickness of mobile electronic apparatus and thus enhance the convenience of the apparatus.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A secondary battery including a cathode and an electrolyte, the secondary battery comprising:
    an anode configured to be formed by stacking a plurality of anode active material layers containing an anode active material on an anode current collector,
    wherein at least two of the plurality of anode active material layers have an uneven surface state comprising projections and recesses and pores are formed by combining the projections and recesses of two of the anode active material layers along a boundary between the two anode active material layers,
    wherein the pores formed along the boundary between the anode active material layers have a pore diameter along a thickness direction of the anode active material layers of 70 nm to 300 nm, and
    wherein at least a part of the pores is filled with the electrolyte and/or a product arising from reduction of the electrolyte upon assembling of a secondary battery.

2. The secondary battery according to claim 1, wherein the pores include fine pores that communicate with each other.

3. The secondary battery according to claim 1, wherein the anode active material layers are formed by a vapor-phase deposition method.

4. The secondary battery according to claim 1, wherein the anode active material contains at least one of elemental silicon, a silicon compound, a silicon alloy, and elemental tin.

5. The secondary battery according to claim 1, wherein the anode current collector is alloyed with the anode active material or is diffused into the anode active material layer across at least a part of a boundary between the anode current collector and the anode active material layer.

6. The secondary battery according to claim 1, wherein a surface roughness of a surface of the anode current collector on which the anode active material layer is provided is 2.0 to 4.5 μm in a ten-point averaged roughness Rz.

7. The secondary battery according to claim 1, wherein the anode current collector is composed of a material containing copper.

8. The secondary battery according to claim 1, wherein a lithium compound is contained in a cathode active material of the cathode.

9. The secondary battery according to claim 1, wherein a fluorine-containing compound obtained by substituting a fluorine atom for a part or all of hydrogen atoms in a cyclic carbonate ester or/and a chain carbonate ester is contained as a solvent of the electrolyte.

10. A secondary battery including a cathode and an electrolyte, the secondary battery comprising:
    an anode configured to be formed by stacking a plurality of anode active material layers containing an anode active material on an anode current collector,
    wherein at least two of the plurality of anode active material layers have an uneven surface state comprising projections and recesses and pores are formed by combining the projections and recesses of two of the anode active material layers along a boundary between the two anode active material layers,
    wherein the pores formed along the boundary between the anode active material layers have a pore diameter along a thickness direction of the anode active material layers of 70 nm to 300 nm,
    wherein at least a part of the pores is filled with the electrolyte and/or a product arising from reduction of the electrolyte upon assembling of a secondary battery, and
    wherein the electrolyte contains at least one of a sulfonic acid, a sulfinic acid, a derivative of a sulfonic acid, and a derivative of a sulfinic acid.

11. The secondary battery according to claim 10, wherein the pores include fine pores that communicate with each other.

12. The secondary battery according to claim 10, wherein the anode active material layers are formed by a vapor-phase deposition method.

13. The secondary battery according to claim 10, wherein the anode active material contains at least one of elemental silicon, a silicon compound, a silicon alloy, and elemental tin.

14. The secondary battery according to claim 10, wherein the anode current collector is alloyed with the anode active material or is diffused into the anode active material layer across at least a part of a boundary between the anode current collector and the anode active material layer.

15. The secondary battery according to claim 1, wherein a surface roughness of a surface of the anode current collector on which the anode active material layer is provided is 2.0 to 4.5 μm in a ten-point averaged roughness Rz.

16. The secondary battery according to claim 1, wherein the anode current collector is composed of a material containing copper.

17. The secondary battery according to claim 1, wherein a lithium compound is contained in a cathode active material of the cathode.

18. The secondary battery according to claim 1, wherein a fluorine-containing compound obtained by substituting a fluorine atom for a part or all of hydrogen atoms in a cyclic carbonate ester or/and a chain carbonate ester is contained as a solvent of the electrolyte.

19. The secondary battery according to claim 1, wherein the uneven surface state comprises an unevenness in a physical state or a chemical state of the surface.

20. The secondary battery according to claim 1, wherein the uneven surface state comprises a variation in an oxygen content among areas of the surface.

21. The secondary battery according to claim 1, wherein the anode active material contains at least one of elemental silicon, a silicon compound, and a silicon alloy.

22. The secondary battery according to claim 10, wherein the anode active material contains at least one of elemental silicon, a silicon compound, and a silicon alloy.

* * * * *